US012770489B2

(12) United States Patent
Georgalas et al.

(10) Patent No.: US 12,770,489 B2
(45) Date of Patent: Oct. 20, 2026

(54) ANOMALY DETECTION

(71) Applicant: BRITISH TELECOMMUNICATIONS PUBLIC LIMITED COMPANY, London (GB)

(72) Inventors: Nektarios Georgalas, London (GB); Matthew Wallwork, London (GB); Claudia Cristina, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 26 days.

(21) Appl. No.: 18/849,999

(22) PCT Filed: Mar. 3, 2023

(86) PCT No.: PCT/EP2023/055462
§ 371 (c)(1),
(2) Date: Sep. 23, 2024

(87) PCT Pub. No.: WO2023/180043
PCT Pub. Date: Sep. 28, 2023

(65) Prior Publication Data
US 2025/0218270 A1 Jul. 3, 2025

(30) Foreign Application Priority Data
Mar. 25, 2022 (GB) ..................................... 2204259

(51) Int. Cl.
*G08B 21/04* (2006.01)

(52) U.S. Cl.
CPC ..... *G08B 21/0423* (2013.01); *G08B 21/0492* (2013.01)

(58) Field of Classification Search
CPC ............ G08B 21/0423; G08B 21/0492; G08B 13/00; G08B 21/0407; G08B 29/188; G08B 13/19613
See application file for complete search history.

(56) References Cited

U.S. PATENT DOCUMENTS 6,975,237 B2 * 12/2005 Barton .................. G08B 17/10 340/629
8,334,906 B2 * 12/2012 Lipton ............ G08B 13/19613 348/169
(Continued)

FOREIGN PATENT DOCUMENTS

EP 1571583 A2 9/2005
WO 2017161457 A1 9/2017
WO 2018152365 A1 8/2018

OTHER PUBLICATIONS

Communication pursuant to Article 94(3) EPC dated Jul. 8, 2025, issued for European Application No. 23 709 389.3-1201 (5 pages).
(Continued)

*Primary Examiner* — Curtis J King
(74) *Attorney, Agent, or Firm* — Nixon & Vanderhye P.C.

(57) ABSTRACT

A computer implemented method of detecting anomalous behaviour within an environment is provided. The environment is monitored by a plurality of sensors providing a plurality of data feeds. Each data feed provides a respective data series representing a respective physical property of the environment over time. The method of detects an occurrence of an event within the environment and identifies a type of that event. The method identifies a plurality of normally correlated data feeds from the plurality of data feeds for the type of the event. The method determines a respective degree of correlation between the respective data series provided by each of the normally correlated data feeds for the occurrence of the event. The method determines a
(Continued)

classification of the behaviour within the environment based on the determined degree(s) of correlation, the classification indicating whether the behaviour is normal or anomalous for the environment. Also provided is a method of training an anomaly detector for detecting anomalous behaviour within such an environment, as well as associated computer systems, computer programs, computer-readable data carriers and data carrier signals for performing such methods.

11 Claims, 4 Drawing Sheets

(56) References Cited

U.S. PATENT DOCUMENTS

| | | | | |
|---|---|---|---|---|
| 10,546,481 | B2 * | 1/2020 | Kusens | G08B 25/001 |
| 10,658,080 | B2 | 5/2020 | Laha et al. | |
| 10,682,097 | B2 | 6/2020 | Bruno et al. | |
| 10,699,541 | B2 * | 6/2020 | Shimura | H04N 7/188 |
| 10,874,794 | B2 * | 12/2020 | Bechtel | G06Q 10/00 |
| 11,106,918 | B2 * | 8/2021 | Ikeda | H04N 23/611 |
| 11,282,361 | B2 * | 3/2022 | Sharma | A61B 5/747 |
| 11,803,955 | B1 * | 10/2023 | Pandya | G08B 29/186 |
| 2003/0058111 | A1 * | 3/2003 | Lee | G08B 13/19641 348/E7.086 |
| 2003/0058341 | A1 * | 3/2003 | Brodsky | G06V 20/52 348/E7.086 |
| 2007/0132597 | A1 * | 6/2007 | Rodgers | G06Q 10/10 348/E7.078 |
| 2008/0284592 | A1 * | 11/2008 | Collins, Jr. | G08B 21/0469 340/541 |
| 2010/0316253 | A1 * | 12/2010 | Yang | G08B 21/0492 382/103 |
| 2012/0106782 | A1 * | 5/2012 | Nathan | G08B 17/12 340/541 |
| 2014/0044305 | A1 * | 2/2014 | Scavezze | H04M 1/724097 382/103 |
| 2014/0267736 | A1 * | 9/2014 | DeLean | G06V 40/103 348/152 |
| 2015/0071492 | A1 * | 3/2015 | Barr | G08B 13/19608 382/103 |
| 2015/0213702 | A1 * | 7/2015 | Kimmel | G06V 20/52 382/103 |
| 2016/0027278 | A1 | 1/2016 | Mcintosh et al. | |
| 2016/0035205 | A1 * | 2/2016 | Messenger | G16H 40/67 340/539.15 |
| 2016/0180239 | A1 | 6/2016 | Frankel et al. | |
| 2016/0328941 | A1 * | 11/2016 | Sundholm | G08B 13/1618 |
| 2018/0261076 | A1 * | 9/2018 | Dixon | G08B 25/10 |
| 2019/0096218 | A1 | 3/2019 | Ehlert et al. | |
| 2019/0103005 | A1 * | 4/2019 | Gilberton | G10L 21/0224 |
| 2020/0043309 | A1 * | 2/2020 | Thörn | G08B 25/08 |
| 2020/0250774 | A1 | 8/2020 | Agarwal et al. | |
| 2020/0294381 | A1 * | 9/2020 | Op Den Buijs | G08B 29/188 |
| 2020/0349241 | A1 | 11/2020 | Shapiro et al. | |
| 2021/0005071 | A1 * | 1/2021 | Sharma | A61B 5/1121 |
| 2021/0166533 | A1 * | 6/2021 | Derickson | G08B 27/001 |
| 2021/0335115 | A1 | 10/2021 | Williams et al. | |
| 2022/0005332 | A1 | 1/2022 | Metzler et al. | |
| 2022/0139190 | A1 | 5/2022 | Williams et al. | |
| 2023/0230465 | A1 * | 7/2023 | Julien | G08B 13/19608 382/103 |
| 2023/0334124 | A1 * | 10/2023 | Carroll | G08B 21/0469 |
| 2023/0377730 | A1 * | 11/2023 | Toleti | G08B 21/0492 |
| 2023/0410526 | A1 * | 12/2023 | Sonawane | G06T 7/0008 |
| 2024/0127688 | A1 * | 4/2024 | Gustof | G08B 25/016 |
| 2024/0280695 | A1 * | 8/2024 | Tanigawa | G06Q 10/04 |
| 2025/0299558 | A1 * | 9/2025 | Yoon | G02B 27/0101 |

OTHER PUBLICATIONS

International Search Report and Written Opinion of the ISA for PCT/EP2023/055462, mailed Jun. 7, 2023, 15 pages.

Combined Search and Examination Report for GB 2204259.2, dated Sep. 21, 2022, 7 pages.

International Preliminary Report on Patentability dated Oct. 10, 2024, issued for PCT/EP2023/055462 (9 pages).

Communication pursuant to Article 94(3) EPC dated Apr. 23, 2026, issued for European Application No. 23 709 389.3 (6 pages).

* cited by examiner

ANOMALY DETECTION

CROSS-REFERENCE TO RELATED APPLICATIONS

This application is the U.S. national phase of International Application No. PCT/EP2023/055462 filed Mar. 3, 2023 which designated the U.S. and claims priority to GB 2204259.2 filed Mar. 25, 2022, the entire contents of each of which are hereby incorporated by reference.

FIELD OF THE INVENTION

The present invention relates to the monitoring of an environment. In particular, it relates to the detection of anomalous behaviour within an environment.

BACKGROUND TO THE INVENTION

The Internet of Things (IoT) concept extends the idea of networking general-purpose computers to the networking of smaller more single-purpose (or at least limited-purpose) devices, such as sensors and actuators. One area in which IoT finds application is in environmental monitoring. That is, multiple IoT devices can be placed within a physical environment to monitor its state. There are a wide array of sensors that may be included within an IoT device to monitor a range of different physical properties of the environment. For example, various IoT devices may include sensors that monitor the air quality, temperature, noise level. Other IoT devices may make use of contact sensors or pressure sensors, for example, to determine whether doors or windows are open or to monitor footfall within the environment. Similarly, motion sensors, such as Passive Infrared (PIR) sensors, may be used by IoT devices to detect movement. Yet other IoT devices may carry out some processing to determine information from a sensor, such as a video camera. For example, the video from the video camera may be processed to determine whether anyone is present in the field of view of the camera (and possibly how many people are present). Facial recognition can also be used to determine whether particular people are present in the camera's field of view. Similar processing can be used to determine a level of vehicular traffic that can be seen by the video camera or to determine whether a particular vehicle is present (e.g. through the use of number plate recognition). Some IoT devices, commonly referred to as "Smart" devices, allow a state of those devices to be determined. For example, a smart doorbell may provide data indicating when the doorbell is pushed (in addition to any video stream that could also be processed). As another example, a smart TV may provide data indicating when the TV is in use. It is also possible for non-IoT objects to be retro-fitted to provide them with IoT functionality. For example, so-called smart tags can be attached to an object (e.g. keys) to allow the presence and location of that object to be tracked within the environment. Similarly, smart light switches and smart power sockets can allow the usage of lights or non-IoT appliances to be determined. Indeed, it will be appreciated that there are a wide range of different IoT devices available—the numbers and types of which are increasing rapidly.

SUMMARY OF THE INVENTION

With the proliferation of available IoT devices, it is commonly desired to make opportunistic use of the data that is available from the IoT devices in an environment to monitor the environment for any anomalous behaviour (also referred to herein as anomalies) occurring within the environment. For example, in a domestic setting, anomalous behaviour within the environment could result from the illness or incapacity of an occupant preventing them from going about their usual activities in their normal manner. As another example, anomalous behaviour within the environment could result from the presence of someone who is not normally present within the environment (e.g. a thief). By identifying anomalous behaviour, an appropriate action can be taken to help mitigate any negative effects that may be occurring. For example, an alarm or notification may be provided to an appropriate person (e.g. a carer or security guard) who can investigate the anomalous behaviour.

Typically, such monitoring is achieved by incorporating some form of domain knowledge about the environment and the types of sensor data available from the IoT devices within that environment. That is to say, it requires an expert to spend time analysing an environment and the available sensor data to identify relationships between the different data feeds (or streams) and specify rules based on those relationships that can be used to determine when anomalous behaviour is occurring within the environment. This can be both slow and costly to implement. Furthermore, as the amount of data about an environment increases (i.e. as a number and/or type of different data feeds increases), it is likely that the available data will be underutilised. That is to say, that there will be relationships between different data feeds within the environment which would allow for detection of anomalies that remain unused. This in turn may lead to a sub-optimal detection of anomalies in the environment. For example, anomalies that could have been detected may be missed. Similarly, a more complete use of the available data may help prevent normal behaviour from being misclassified as anomalous.

Accordingly, it would be beneficial to provide a way of discovering insights into the relationships between the data feeds provided by the IoT devices within an environment to allow for improved detection of anomalous behaviour within an environment.

In a first aspect of the present invention, there is provided a computer implemented method of detecting anomalous behaviour within an environment that is monitored by a plurality of sensors providing a plurality of data feeds, each data feed providing a respective data series representing a respective physical property of the environment over time, the method comprising: detecting an occurrence of an event within the environment and identifying a type of that event; identifying a plurality of normally correlated data feeds from the plurality of data feeds for the type of the event; determining a respective degree of correlation between the respective data series provided by each of the normally correlated data feeds for the occurrence of the event; and determining a classification of the behaviour within the environment based on the determined degree(s) of correlation, the classification indicating whether the behaviour is normal or anomalous for the environment.

The classification of the behaviour within the environment may be further based on a normal degree of correlation between the data series from the normally correlated data feeds for the type of the event.

A predetermined action may be carried out in response to determining that the behaviour is classified as being anomalous for the environment. The predetermined action may comprise one or more of: providing a notification of the anomalous behaviour; and increasing a level of monitoring of the environment.

The occurrence of the event may be detected based on the respective data series provided by one or more of the data feeds and the plurality of normally correlated data feeds may comprise at least one data feed that was not used to detect the occurrence of the event.

The method may further comprising receiving contextual data for the environment. The detection of the occurrence of the event may be based, at least in part, on the contextual data.

The environment may be a domestic environment for occupation by one or more occupants.

The contextual data may comprise a calendar entry for at least one of the occupants.

By analysing the correlations between data series provided by different data feeds from the sensors within the environment that would normally correlate with each other when a particular type of event occurs, the method can detect anomalous behaviour (e.g. when those data feeds do not correlate sufficiently with each other when that type of event occurs).

In a second aspect of the present invention, there is provided a computer implemented method of training an anomaly detector for detecting anomalous behaviour within an environment that is monitored by a plurality of sensors providing a plurality of data feeds, each data feed providing a respective data series representing a respective physical property of the environment over time, the method comprising: receiving training data comprising respective data series obtained from the data feeds while normal behaviour is occurring within the environment; detecting one or more occurrences of a type of event within the environment from the training data; determining a correlation between the data series for each of the data feeds for each of the one or more occurrences of the type of event in the training data; identifying, based on the determined correlations, a subset of the data feeds that normally correlate for that type of event; and storing an indication of the subset of the data feeds that normally correlate for that type of event for use by the anomaly detector to detect anomalous behaviour by performing a method according to any one of claims 1 to 9.

The method may further comprise: determining a normal degree of correlation between the data series from the subset of the data feeds for that type of event based on the determined correlations between the data series for each of the data feeds for each of the one or more occurrences of the type of event in the training data; and storing the normal degree of correlation in association with the indication of the subset of the data feeds that normally correlate for that type of event.

Through the analysis of correlations between the data series provided by different data feeds from the sensors within the environment whenever an event occurs whilst the environment is operating under normal conditions (i.e. during a training period where normal behaviours are being exhibited within the environment), the method learns those data feeds that normally correlate with each other when such an event occurs. This knowledge enables anomalous behaviour to be detected later on (i.e. during a live period).

In a third aspect of the present invention, there is provided a computer system comprising a processor and a memory storing computer program code for performing a method according to either of the first or second aspects.

In a fourth aspect of the present invention, there is provided a computer program comprising instructions which, when executed by a computer, causes the computer to carry out a method according to either of the first or second aspects.

In a fifth aspect of the present invention, there is provided a computer-readable data carrier having stored thereon a computer program according to the fourth aspect.

In a sixth aspect of the present invention, there is provided a data carrier signal carrying a computer program according to the fourth aspect.

BRIEF DESCRIPTION OF THE FIGURES

Embodiments of the present invention will now be described by way of example only, with reference to the accompanying drawings, in which.

DETAILED DESCRIPTION OF EMBODIMENTS

Figure 1:
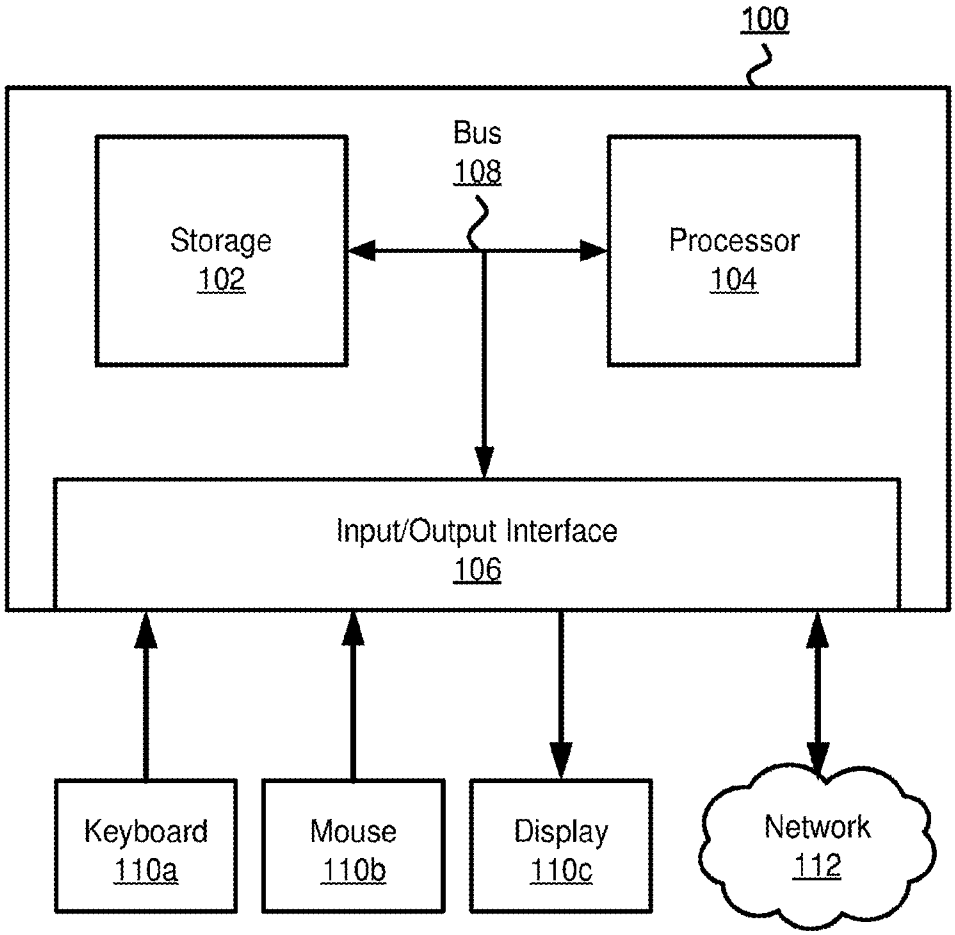
FIG. 1 is a block diagram of a computer system suitable for the operation of embodiments of the present invention.

FIG. 1 is a block diagram of a computer system 100 suitable for the operation of embodiments of the present invention. The system 100 comprises: a storage 102, a processor 104 and an input/output (I/O) interface 106, which are all communicatively linked over one or more communication buses 108.

The storage (or storage medium or memory) 102 can be any volatile read/write storage device such as a random access memory (RAM) or a non-volatile storage device such as a hard disk drive, magnetic disc, optical disc, ROM and so on. The storage 102 can be formed as a hierarchy of a plurality of different storage devices, including both volatile and non-volatile storage devices, with the different storage devices in the hierarchy providing differing capacities and response times, as is well known in the art.

The processor 104 may be any processing unit, such as a central processing unit (CPU), which is suitable for executing one or more computer programs (or software or instructions or code). These computer programs may be stored in the storage 102. During operation of the system, the computer programs may be provided from the storage 102 to the processor 104 via the one or more buses 108 for execution. One or more of the stored computer programs, when executed by the processor 104, cause the processor 104 to carry out a method according to an embodiment of the invention, as discussed below (and accordingly configure the system 100 to be a system 100 according to an embodiment of the invention).

The input/output (I/O) interface 106 provides interfaces to devices 110 for the input or output of data, or for both the input and output of data. The devices 110 may include user input interfaces, such as a keyboard **110*a* or mouse 110*b* as well as user output interfaces such as a display 110*c*. Other devices, such a touch screen monitor (not shown) may provide means for both inputting and outputting data. The input/output (I/O) interface 106 may additionally or alternatively enable the computer system 100 to communicate with other computer systems via one or more networks 112. It will be appreciated that there are many different types of I/O interface that may be used with computer system 100** and that, in some cases, computer system 100 may include more than one I/O interface. Furthermore, there are many different types of device 110 that may be used with computer system 100. The devices 110 that interface with the computer system 100 may vary considerably depending on the nature of the computer system 100 and may include devices not explicitly mentioned above, as would be apparent to the skilled person. For example, in some cases, computer system 100 may be a server without any connected user input/output devices. Such a server may receive data via a network 112, carry out processing according to the received data and provide the results of the processing via a network 112.

It will be appreciated that the architecture of the system 100 illustrated in FIG. 1 and described above is merely exemplary and that other computer systems 100 with different architectures (such as those having fewer components, additional components and/or alternative components to those shown in FIG. 1) may be used in embodiments of the invention. As examples, the computer system 100 could comprise one or more of: a personal computer; a laptop; a tablet; a mobile telephone (or smartphone); a television set (or set top box); a games console; an augmented/virtual reality headset; a server; or indeed any other computing device with sufficient computing resources to carry out a method according to embodiments of this invention.

Figure 2:
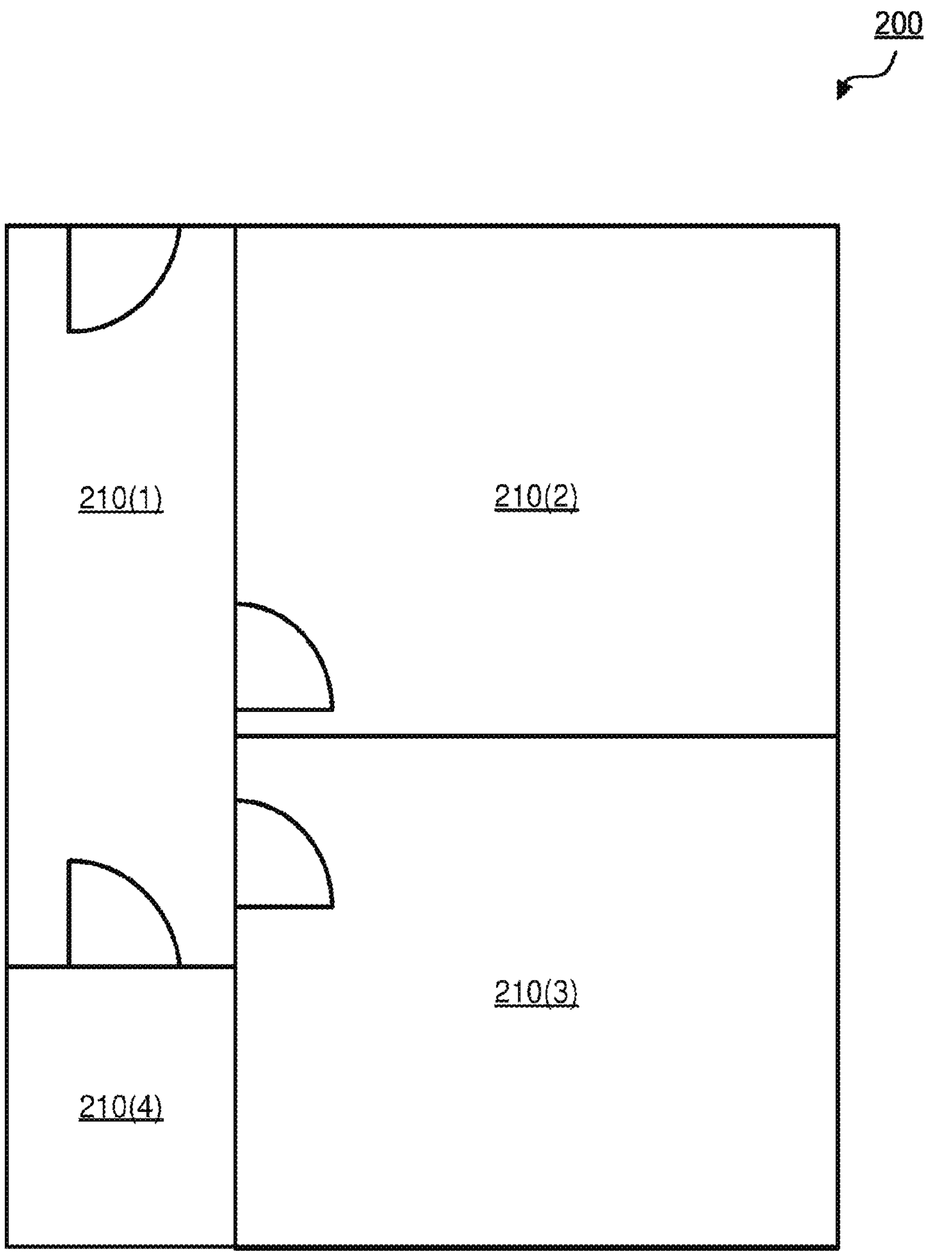
FIG. 2 is a diagrammatic illustration of an example environment which may be monitored by embodiments of the invention to detect anomalous behaviour.

FIG. 2 is a diagrammatic illustration of an example environment 200 which may be monitored by embodiments of the invention to detect anomalous behaviour. The environment 200 is a domestic environment which may be occupied by one or more occupants. The environment 200 comprises a plurality of rooms 210, including a hallway 210(1), a living area 210(2), a bedroom 210(3) and a bathroom 210(4). The living area 210(2), bedroom 201(3) and bathroom 210(4) are all connected to the hallway 210(1) by internal doors. Meanwhile an external door allows both entry to and exit from the environment via the hallway 210(1).

The environment 200 may contain any number (and type) of IoT devices (not shown). As already discussed, such IoT devices will typically include one or more sensors that will monitor a physical property (or properties) of the environment 200. These IoT devices each provide one or more data feeds, such that there are a plurality of data feeds available for the environment from the various IoT devices contained therein. The data feeds each provide a data series representing a physical property of the environment over time. That is to say at any given time, the data feeds provide data points representing a value of the physical property at that time (or at least the latest value of the physical property that has been measured), thereby allowing a sequence of values representing the physical property to be obtained spanning a particular period of time. In some cases, the values provided as a data series may be numerical, such as a value representing a temperature measurement. Of course, in other cases, any other type of data value forming a data series for a physical property of the environment may be used. In some other cases, the values provided as a data series may be Boolean, such as a value representing whether a contact sensor is open or closed. The values may be relatively directly obtained from the sensor contained in the IoT device with no (or minimal) processing, such as in the case of the aforementioned example of the temperature and contact sensors. In other cases, an IoT device may provide a data feed that is the result of more substantial processing of the raw data from one or more sensors. For example, a video feed may be analysed to determine whether a person is present in the field of view and a data feed providing a series of Boolean values indicating whether a person is present or not may be provided. Such processing may be carried out by the IoT device itself or, alternatively, may be available from another data processing service carried out by another device (such as from a cloud server).

The IoT devices within the environment 200 may include a number of static IoT devices. That is to say, IoT devices which are statically installed within the environment. Such IoT devices are typically located in a fixed position within the environment and never (or at least rarely) move. For example, the environment 200 may include static IoT (or smart) devices, such as: thermostats, sound monitors, air quality monitors, smoke alarms, contact sensors on the doors and windows, doorbells, sockets, light switches, PIR sensors, pressure sensors, video cameras, electricity and gas meters and so on. Additionally, the IoT devices may include personal IoT devices. That is, IoT devices which are associated with a particular occupant of the environment (or their belongings). For example, the occupant may wear a smart watch which provides various biological measurements of the occupant, such as their pulse or step count. Similarly a sleep tracking mat may be present in the occupant's bed to track their sleeping habits. Additionally smart tags may be attached to or incorporated into the occupant's belongings, such as their wallet or keys to allow the presence and location of these belongings within the environment 200 to be determined. Of course, it will be appreciated that these are merely examples of the types of IoT devices that could be present in a typical domestic environment, such as environment 200. Any number of different types of IoT devices may be present, including any other suitable IoT devices not listed here.

The operation of the invention will be discussed with respect to this example environment 200. However, it will be appreciated that this is merely an example and that other domestic environments 200 having a different layout to that shown in FIG. 2 may be used instead. Similarly, the invention can be applied to other types of environment other than domestic environments. For example, the invention may be applied to an office, commercial or public environment to detect anomalous behaviour within such environments.

Figure 3:
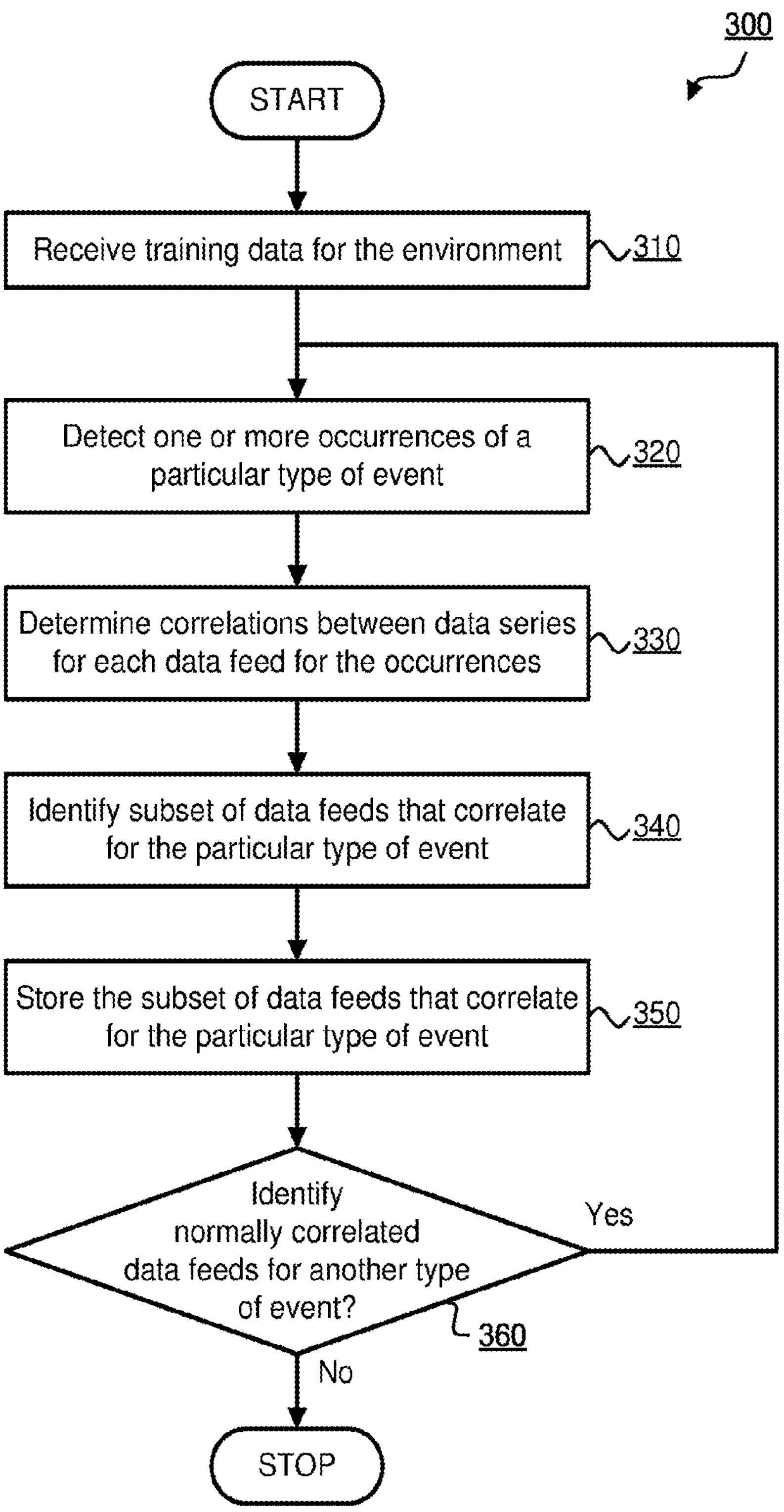
FIG. 3 is a flowchart representation of a method of training an anomaly detector for detecting anomalous behaviour with an environment, such as the example environment illustrated in FIG. 2.

FIG. 3 is a flowchart representation of a method 300 of training an anomaly detector for detecting anomalous behaviour with an environment, such as the example environment 200 illustrated in FIG. 2.

At an operation 310, the method 300 receives training data for the environment. The training data comprises respective data series obtained from the available data feeds from the IoT devices within the environment during a training period. The training period is a period in which normal behaviour is occurring within the environment 200. That is to say, the data from the data feeds of the IoT devices in the environment is obtained during a period in which no anomalous behaviour occurs within the environment (and so the training data does not reflect any anomalous behaviour). Having obtained the training data, the method proceeds to an operation 320.

At operation 320, the method 300 detects one or more occurrences of a particular type of event. That is to say, the method 300 identifies points in time within the training period at which occurrences of that type of event happened.

The detection of occurrences of the type of event may be based on one or more rules that are provided to the method 300. These rules may incorporate elements of knowledge about the specific environment 200 and its occupants. For example, a rule (or policy) may be provided defining that a "wake up" event is determined to occur when a sleep tracking mat indicates that the user has got out of bed and the time is between 06:30 and 08:00.

Alternatively, the events may be determined from the available data feeds themselves. That is to say, the method 300 may identify changes occurring in the values provided by one or more of the data feeds as being an event. For example, where a particular data feed provides a Boolean data series, an event may be determined to occur whenever the value changes from one state to the other. For example, a data feed from an IoT 'smart' doorbell may change state when the doorbell is pressed. Other more complex (or composite) event types may be determined from the values of multiple data feeds. For example, an event may be determined to occur when the values of two different data feeds have specific respective values, such as when a first Boolean data feed goes from a low (e.g. False) state to a high (e.g. True) state at about the same time as a second Boolean data feed goes from a high (e.g. True) state to a low (e.g. False) state. Where the event type is to be detected from the values of multiple data feeds, the method 300 may employ a pre-determined window of time within which the values must occur relative to each other for an event to be detected. This approach allows events to be detected without requiring any expert knowledge relating to the semantics of the data feed. That is to say, the method 300 may detect events from changes in the data feeds without needing to know what the data series provided by those feeds represents or how it relates to any of the other data feeds (e.g. taking the doorbell example, the method 300 does not need to 'know' that the data feed represents a doorbell or have any semantic understanding of what a doorbell is).

In some cases, the training data may also include contextual data for the environment 200. That is, data which is not a directly sensed physical property of the environment, but which nonetheless provides some context for the activity occurring in the environment 200. As an example, the contextual data may include one or more calendar entries from a calendar for one of the occupants of the environment 200. The occurrence of an event may be determined entirely from such calendar entries. For example, instances of a regular appointment (e.g. a doctor's appointment or a social club meeting) may be considered to be the events. Alternatively, the contextual data may be used in combination with the sensed data from the environment 200 to specify more granular types of events. For example, the contextual data could include an indication of the weather conditions at different points in time during the training period. Therefore, instead of simply having a single event based on the data feed from an IoT device, multiple different events can be defined, one for each context. For example, an "external door opened" event that may be determined to occur when a contact sensor on the external door leading to/from the environment 200 is opened could alternatively or additionally be split into two (or more) more focussed context-dependent events, such as "external door opened when it is raining" and "external door opened when it is dry" based on the contextual data.

Of course, it is expected that method 300 may be performed iteratively for many different types of event, in which case, the detection of some event types may be based on rules incorporating elements of a priori knowledge about the environment 200 and its occupants, whilst other event types may be discovered from the data feeds themselves without requiring any such knowledge. Indeed, where sufficient time and resources are available for performing the method 300, the method 300 may experiment (in separate iterations) with many different combinations of states of the different data feeds in order to search for and automatically identify those events that are most useful for anomaly detection.

Having detected occurrences of a particular type of event during the training period, the method 300 proceeds to an operation 330.

At operation 330, the method 300 determines correlations between the data series for each data feed for the occurrences. As will be known to those skilled in the art, a correlation is a measure describing the degree to which two data series are statistically related. That is to say, how likely the values of two data series change in relation to each other. Two data series that have a high degree of correlation will tend to change at the same time. There are many different statistical measurements of correlation and, in general, any suitable technique for determining a correlation measure between two data series can be used.

To determine the correlation between two data series for an occurrence of an event, a window of each data series is defined relative to the time that the event occurred. The data of each data series inside these windows may be compared (while data outside of these windows is ignored). This window has a predetermined duration and may be centred on the time that the event occurred such that there is a portion of time prior to the event and a portion of time subsequent to the event covered by the window. In some cases, the windows for each data series may be slid relative to each other and the time of the event so that different portions of each data series are compared relative to the time the event occurred. This technique will be familiar to the skilled person and can account for any delayed correlation between the two data series and the event itself. In general, the window of each data series may be slid relative to each other until the largest correlation value is found (within some predetermined bounds). This largest correlation value may then be considered to be the degree of correlation between those data series for that type of event. Where such a 'sliding window' approach is taken, a note of the offset between the centre of each window and the time of the event that yielded the largest correlation value between the data series may also be stored.

The operation applies this technique to every pair of data feeds that are available within the environment 200 in order to determine a measure of correlation between each data feed relative to the occurrence of the event. Having obtained measures of correlation between all of the available data feeds, the method 300 proceeds to an operation 340.

At operation 340, the method 300 identifies a subset of the available data feeds that correlate for the particular type of event. That is to say, the method 300 identifies those data feeds whose data series normally correlate with each other whenever that type of event occurs, based on the correlations determined for occurrences of that event type in the training data. Any suitable technique may be used to select those data feeds that normally correlate based on the correlations that were determined for identified occurrences of such events during the training period. An average of the measures of correlation between each pair of data feeds across all occurrences of the event type during the training period may be calculated. This average measure of correlation may be used to identify those data feeds that have a strong correlation with each other in association with the event. For example, a predetermined threshold may be specified and all pairs of data feeds having an average correlation that is greater than that threshold may be identified as the subset of data feeds that normally correlate for that event type. Additionally or alternatively, a predetermined number of the pairs of data feeds may be selected that have the highest average measures of correlation. In some cases, a measure of variance in the correlation between each pair of data feeds across all occurrences of the event type during the training period may be calculated. The measure of variance may be used to further refine the selection of the subset of data feeds that normally correlate for a particular event. That is to say, the identification of the subset of data feeds may be further based on the variance in the measures of correlation between each pair of data feeds for occurrences of that event type during the training period. For example, a predetermined threshold may be specified and any pairs of data feed having a variance in the determined measures of correlation that is greater than the predetermined threshold may be discarded, meaning that they will not be included in the subset of normally correlating data feeds for that event type (even if their average correlation is high).

As will be appreciated, the correlation between two data feeds may be positive (i.e. the data series from both data feeds tends to increase and decrease at the same time) or negative (i.e. the data series from one data feed tends to increase when the data series from the other data feed decreases and vice-versa in an inverse relationship). In some cases, the sign of the average correlation may be taken into consideration when identifying the subset of normally correlated data feeds for an event type. For example, the subset may be selected to include only strongly positively correlated pairs of data feeds (or conversely only strongly negatively correlated pairs of data feeds). However, in other cases, the sign of the average correlation may be disregarded such that only the magnitude of the correlation is taken into consideration. For example, the subset may be selected to include any data feeds that are strongly correlated, whether positively or negatively.

In some cases, all of the data feeds may be insufficiently correlated in relation to a particular event type to identify a subset of normally correlated data feeds for that event type. For example, the correlation between each of the data feeds may be less than a predetermined threshold. In such cases, the event type itself may be discarded. That is to say, the event type may be identified as being unsuitable for anomaly detection in the environment 200, such that that event type will not be used by the anomaly detector. This may be particularly useful in the case where a large number of candidate event types are considered by the method 300 based solely on the values of the data feeds, without any knowledge of the environment or the normal behaviour within that environment or the nature of the data feeds or their inter-relationships (as discussed in relation to operation 320 above).

Having identified a subset of the available data feeds that normally correlate for the particular type of event, the method proceeds to an operation 350.

At operation 350, the method 300 stores an indication of the identified subset of data feeds that normally correlate for the particular type of event. This allows the anomaly detector to retrieve the subset of data feeds that correlate for a particular type of event later on when it is being used to detect anomalies, as will be discussed in more detail below. For example, data indicating which of the available data feeds in the environment 200 have been identified as normally correlating for the particular type of event may be written to a storage 102 of the anomaly detector.

In addition to storing an indication of the identified subset of data feeds, the method 200 may also store additional information about the normal correlations between those data feeds in the subset. For example, the method may store an indication of the nature of the correlation (i.e. positive or negative) between each of the data feeds in the subset. As a further example, the method 200 may store the average measure of correlation between each of the data feeds in the subset (e.g. a correlation matrix providing the respective average measure of correlation between each pair of data feeds). Additionally, the method 300 may also store the variance (or deviation) of the measures of correlation between each of the data feeds in the subset. This additional information may assist the anomaly detector when detecting anomalies as will be discussed in more detail below.

Furthermore, the method 300 may store information to aid in the detection of the particular type of event to which the subset of data feeds normally correlates. That is to say, the criteria that were used at operation 320 to detect occurrences of the type of event from the training data may be stored for later use by the anomaly detector. For example, where the type of event was detected based on a provided rule, that rule may be stored. Similarly, where the event is determined based on the data feeds themselves (i.e. without utilising any a priori knowledge) an indication of the specific feeds and values that are considered to form the event may be stored (e.g. the method 300 may store an indication that the event type is considered to occur when a specific data feed changes from a low state to a high state). Of course, it will be appreciated that this information could be stored separately. That is to say, the indication of the subset of normally correlating data feeds that are stored for a particular event type may refer to an identifier of the event type to which they relate. Meanwhile a separate repository may contain data for enabling detection of different types of event, again referenced by an identifier.

Having stored an indication of the identified subset of normally correlating data feeds for the event type, the method proceeds to an operation 360.

At operation 360, the method 300 determines whether to continue training. As mentioned above, it is anticipated that the method 300 may be performed in relation to many different types of event that may occur within the environment 200. Accordingly, where there are further event types to be trained against, the method 300 may perform another iteration in respect of another type of event, in which case, the method 300 returns to operation 320. Of course, although the training of the anomaly detector in relation to multiple different types may be performed iteratively (as shown in FIG. 3), it is additionally (or alternatively) possible for different instances of the method 300 to be performed partly or substantially in parallel, as will be understand by the skilled person. If no further iterations of the method 300 are to be performed, the method 300 ends.

Figure 4:
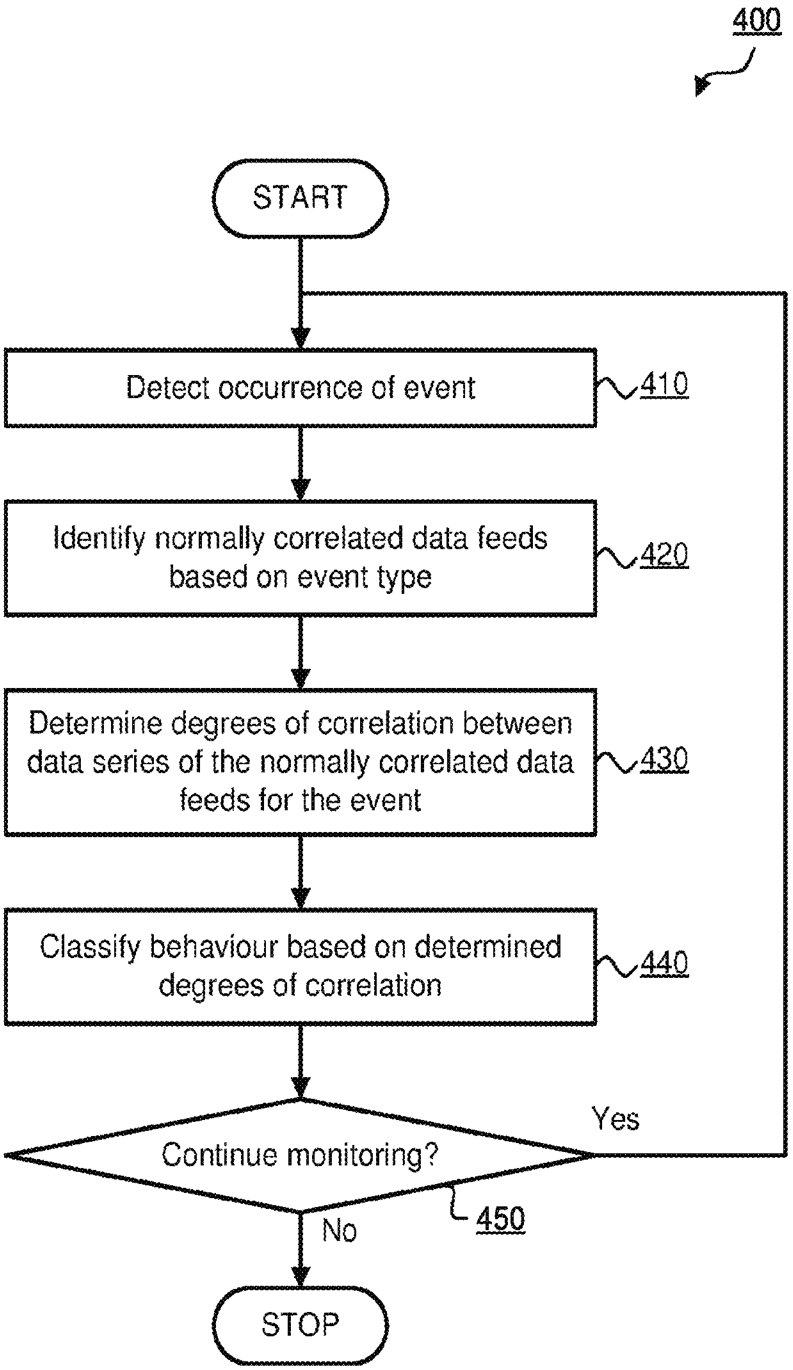
FIG. 4 is a flowchart representation of a method of detecting anomalous behaviour within an environment, such as the example environment illustrated in FIG. 2.

FIG. 4 is a flowchart representation of a method 400 of detecting anomalous behaviour within an environment, such as the example environment 200 illustrated in FIG. 2.

At an operation 410, the method 400 detects an occurrence of an event within the environment. As discussed in relation to operation 350 of method 300, the anomaly detector is provided with data that allows occurrences of one or more different types of events within the environment 200 to be detected. This data may indicate, for example, that a particular type of event may be detected based on the respective data series provided by one or more of the data feeds available from the IoT devices within the environment 200. Specifically, this data may indicate that an event should be detected when one or more of the data feeds have specific respective values (e.g. when a Binary data feed transitions from a low value to a high value).

As already discussed, in some cases, the detection of the occurrence of the event may be based, at least partly, on contextual data for the environment 200, such as the calendar of one of its occupants or the current weather conditions. In such cases, the method 400 may receive or retrieve contextual data for the environment 200 and uses that contextual data to detect an occurrence of that type of event.

Having detected an event occurring in the environment 200, the method 400 proceeds to an operation 420.

At operation 420, the method 400 identifies the data feeds whose data series are normally correlated with each other for that type of event. These normally correlated data feeds may have been determined during a training period, such as by the method 300 described in relation to FIG. 3. Accordingly, the method 400 may simply retrieve a set of data feeds that have previously been determined as being normally correlated in the presence of the type of event that was detected during operation 410. It should be noted that the set of normally correlated data feeds identified at operation 420 are entirely separate from any data feeds that were used to detect the event during operation 410. In some cases, for example, the set of normally correlated data feeds may not include any of the data feeds that were used to detect the event. However, of course, in some cases there may be more overlap. For example, the set of normally correlated data feeds may include any data feeds that were used to detect the event as well as at least one other data feed that was not used to detect the occurrence of the event.

Having identified the normally correlated data feeds for the type of event that was detected, the method proceeds to an operation 430.

At operation 430, the method 400 determines a respective degree of correlation between each of the respective data series provided by each of the normally correlated data feeds for the occurrence of the event. The same correlation technique is used to determine the respective degrees of correlation between the data series provided by the normally correlated data feeds as was used during operation 330 to prepare the data indicating the normally correlated data feeds. Similarly, the same size window is used for each data feed as was used during operation 330 to prepare the data from the training data. In some cases, the correlation technique to be used may be indicated by that data in association with the set of normally correlated data feeds for that event type. This can allow different correlation techniques to be used with different event types. However, this is not necessary, and the use of a specific correlation technique may be predetermined.

As discussed in relation to operation 330, a sliding window technique may be used when determining the correlations between data feeds during the training period. This same technique may be repeated when determining the degree of correlations between the normally correlated data feeds during operation 430. In some cases, this may involve repeating the sliding window analysis to find the maximum correlation between two data feeds. In other cases, as previously discussed, the relative offsets of the window for each data feed relative to the event may be stored and reused at operation 430.

Having determined the respective degrees (or measures) of correlation between the normally correlated data feeds for the event, the method 400 proceeds to an operation 440.

At operation 440, the method 400 determines a classification of the behaviour within the environment. This classification is based, at least in part, on the degrees of correlation that were determined at operation 430. The classification serves to indicate whether behaviour occurring within an environment (e.g. of an occupant) is normal or anomalous for that environment. It will be appreciated that there are many different ways in which a classification of the behaviour may be determined from the degrees of correlation between the normally correlating data feeds for an event type.

For example, the method 400 may check whether each of the degrees of correlation between the data feeds is greater than a predetermined threshold and, if so, may determine that normal behaviour is occurring within the environment. Otherwise, if the correlation between any of the normally correlated data feeds is less than the predetermined threshold, the method 400 may determine that abnormal or anomalous behaviour is occurring. Alternatively, an average of the degrees of correlation between the data feeds may be taken and compared to a threshold to determine whether the behaviour within the environment is normal (if the average correlation is higher than the threshold) or anomalous (if the average correlation is lower than the threshold). This approach may allow some of the data feeds to individually have a correlation that is slightly lower than the threshold whilst still classifying the behaviour as normal.

Alternatively, where additional information is available about the normally correlated data feeds for the event type, this additional information may be used as part of the classification of the behaviour within the environment. For example, as discussed in relation to operation 350 of method 300, the typical correlation between each pair of data feeds in the set of normally correlated data feeds may be stored. The actual correlation between each pair of data feeds in the set of normally correlated data feeds may therefore be compared to the typical correlation between each pair of data feeds. A classification of the behaviour as anomalous may then be made if any of the actual degrees of correlation between the normally correlated data feeds is lower than the typical correlation for that particular pair of data feeds. Similarly, where a typical variance for the degree of correlation between pairs of normally correlated data feeds has been stored, this may also be used. For example, a classification of the behaviour as anomalous may be determined if the correlation between any pair of normally correlated data feeds is less than a standard deviation lower than the typical degree of correlation between those data feeds.

Having classified the behaviour occurring within the environment based on the actual degrees of correlation between the data series from the normally correlated data feeds for that type of event, the method 400 proceeds to an operation 450.

At operation 450, the method 400 determines whether to continue monitoring the environment 200. It is generally expected that the method 400 will be continuously operating so as to provide ongoing monitoring of the environment (although this is not necessary). If monitoring is to continue, the method 400 reiterates to operation 410 to detect the next event occurring in the environment 200. Otherwise, the method 400 ends.

Although not shown in FIG. 4, the classification of the behaviour occurring within the environment at operation 440 may be used to trigger appropriate actions to be taken to mitigate any anomalous behaviour occurring in the environment 200 that may be detrimental to the environment 200 and/or its occupants. That is to say, one or more predetermined actions may be carried out in response to determining that the behaviour is classified as being anomalous for the environment. For example, a notification of the anomalous behaviour may be provided to a supervising entity for the environment or its occupants, such as to a nearby warden responsible for the wellbeing of the environment's occupants. Similarly, a level of monitoring of the environment may be increased to allow a better detection, identification and/or investigation of any issues occurring within the environment.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example. Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention. It will be understood by those skilled in the art that, although the present invention has been described in relation to the above-described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of detecting anomalous behaviour within an environment that is monitored by a plurality of sensors providing a plurality of data feeds, each data feed providing a respective data series representing a respective physical property of the environment over time, wherein the environment is a domestic environment for occupation by one or more occupants, the method comprising:

receiving contextual data for the environment, wherein the contextual data comprises a calendar entry for at least one of the occupants:

detecting an occurrence of an event within the environment and identifying a type of the event based, at least in part, on the contextual data;

identifying a plurality of normally correlated data feeds from the plurality of data feeds for the type of the event;

determining a respective degree of correlation between the respective data series provided by each of the normally correlated data feeds for the occurrence of the event;

determining a classification of the behaviour within the environment based on the determined degree(s) of correlation, the classification indicating whether the behaviour is normal or anomalous for the environment; and performing a predetermined action in response to determining that the behaviour is classified as being anomalous for the environment, wherein the predetermined action comprises increasing a level of monitoring of the environment by the plurality of sensors.

2. The method of claim 1, wherein the classification of the behaviour within the environment is further based on a normal degree of correlation between the data series from the normally correlated data feeds for the type of the event.

3. The method of claim 1, wherein the occurrence of the event is detected based on the respective data series provided by one or more of the data feeds and the plurality of normally correlated data feeds comprises at least one data feed that was not used to detect the occurrence of the event.

4. The method of claim 1, wherein:

the contextual data further comprises an indication of weather conditions.

5. A computer implemented method of training an anomaly detector for detecting anomalous behaviour within an environment that is monitored by a plurality of sensors providing a plurality of data feeds, each data feed providing a respective data series representing a respective physical property of the environment over time, wherein the environment is a domestic environment for occupation by one or more occupants, the method comprising:

receiving training data comprising respective data series obtained from the data feeds while normal behaviour is occurring within the environment;

receiving contextual data for the environment, wherein the contextual data comprises a calendar entry for at least one of the occupants;

detecting one or more occurrences of a type of event within the environment from the training data and based, at least in part, on the contextual data;

determining a correlation between the data series for each of the data feeds for each of the one or more occurrences of the type of event in the training data;

identifying, based on the determined correlations, a subset of the data feeds that normally correlate for that type of event; and storing an indication of the subset of the data feeds that normally correlate for that type of event for use by the anomaly detector to detect anomalous behaviour by performing the computer implemented method of detecting anomalous behaviour according to claim 1.

6. The method of claim 5, further comprising:

determining a normal degree of correlation between the data series from the subset of the data feeds for that type of event based on the determined correlations between the data series for each of the data feeds for each of the one or more occurrences of the type of event in the training data; and storing the normal degree of correlation in association with the indication of the subset of the data feeds that normally correlate for that type of event.

7. A computer system for detecting anomalous behaviour within an environment that is monitored by a plurality of sensors providing a plurality of data feeds, each data feed providing a respective data series representing a respective physical property of the environment over time, wherein the environment is a domestic environment for occupation by one or more occupants, the computer system comprising a processor and a memory storing computer program code which, when executed by the processor, causes the computer system to at least be configured to:

receive contextual data for the environment, wherein the contextual data comprises a calendar entry for at least one of the occupants;

detect an occurrence of an event within the environment and identify a type of the event based, at least in part, on the contextual data;

identify a plurality of normally correlated data feeds from the plurality of data feeds for the type of the event;

determine a respective degree of correlation between the respective data series provided by each of the normally correlated data feeds for the occurrence of the event;

determine a classification of the behaviour within the environment based on the determined degree(s) of correlation, the classification indicating whether the behaviour is normal or anomalous for the environment; and perform a predetermined action in response to determining that the behaviour is classified as being anomalous for the environment, wherein the predetermined action comprises increasing a level of monitoring of the environment by the plurality of sensors.

8. The computer system of claim 7, wherein the classification of the behaviour within the environment is further based on a normal degree of correlation between the data series from the normally correlated data feeds for the type of the event.

9. The computer system of claim 7, wherein the occurrence of the event is detected based on the respective data series provided by one or more of the data feeds and the plurality of normally correlated data feeds comprises at least one data feed that was not used to detect the occurrence of the event.

10. The computer system of claim 7, wherein:

the contextual data further comprises an indication of weather conditions.

11. A non-transitory computer-readable data carrier storing a computer program comprising instructions which, when executed by a computer, cause the computer to perform steps for detecting anomalous behaviour within an environment that is monitored by a plurality of sensors providing a plurality of data feeds, each data feed providing a respective data series representing a respective physical property of the environment over time, wherein the environment is a domestic environment for occupation by one or more occupants, the steps comprising:

receiving contextual data for the environment, wherein the contextual data comprises a calendar entry for at least one of the occupants;

detecting an occurrence of an event within the environment and identifying a type of the event based, at least in part, on the contextual data;

identifying a plurality of normally correlated data feeds from the plurality of data feeds for the type of the event;

determining a respective degree of correlation between the respective data series provided by each of the normally correlated data feeds for the occurrence of the event;

determining a classification of the behaviour within the environment based on the determined degree(s) of correlation, the classification indicating whether the behaviour is normal or anomalous for the environment; and performing a predetermined action in response to determining that the behaviour is classified as being anomalous for the environment, wherein the predetermined action comprises increasing a level of monitoring of the environment by the plurality of sensors.

* * * * *